Sept. 29, 1925.
J. BROOKS ET AL
LIGHT BEAM DEFLECTOR
Filed Nov. 7, 1922
1,555,397
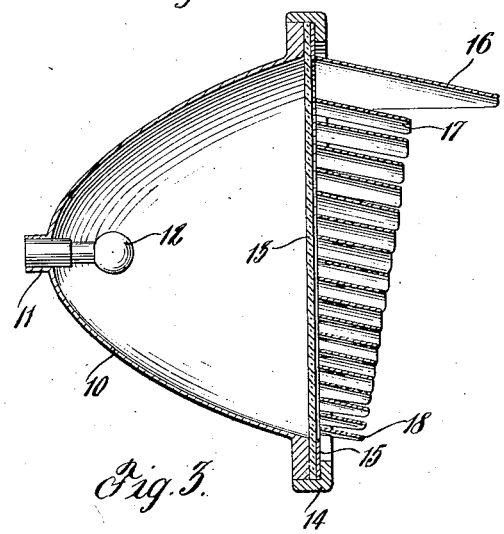
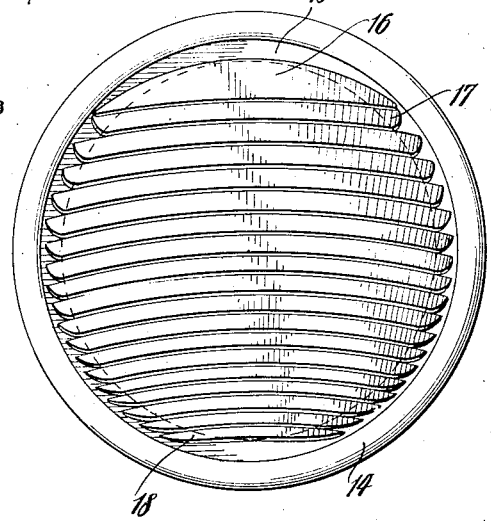
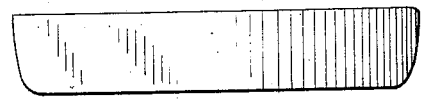
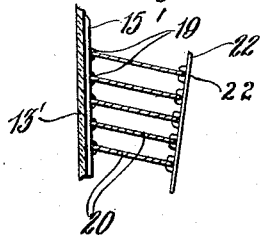
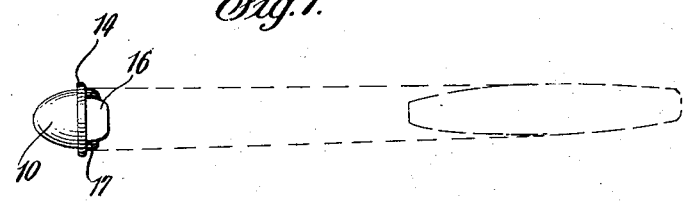
Inventor
Jesse Brooks & James Dean
By their Attorney Patented Sept. 29, 1925.

1,555,397

UNITED STATES PATENT OFFICE.

JESSE BROOKS AND JAMES DEAN, OF PATERSON, NEW JERSEY, ASSIGNORS TO NO-GLARE-DEFLECTOR CORPORATION, OF NEW YORK, N. Y., A CORPORATION OF NEW YORK.

LIGHT-BEAM DEFLECTOR.

Application filed November 7, 1922. Serial No. 599,600.

*To all whom it may concern:*

Be it known that we, JESSE BROOKS and JAMES DEAN, citizens of the United States, and residents of, respectively, 88 Belmont Ave. and 423 E. 18th St., Paterson, in the county of Passaic and State of New Jersey, have invented certain new and useful Improvements in Light-Beam Deflectors, of which the following is a specification.

This invention relates in general to reflector light-beam deflectors, dimmers or modifiers, and is particularly adapted for use with headlights of moving vehicles.

The primary objects of our invention are not merely to deflect the rays or a portion thereof toward the ground so as to preclude blinding of the eyes of the driver of an approaching vehicle, as is prescribed by law in many States, but also, to scientifically concentrate the light rays upon the road, thus intensifying the light power of the reflector.

The aforementioned feature will be clearer when the construction and the effects due to the construction of a light reflector are considered.

It is a known fact that a correctly designed light reflector is of paraboloidal shape and that the light source is placed at the focus of the paraboloid from where all light rays are reflected through the lens or glass in substantially parallel relation to each other, thus forming a cylindrical beam of light thrown forwards in the direction of the principal axis of the paraboloid reflector.

This is theoretically correct. Yet in practice it will be seen that a beam of the shape of a cone is produced even by fairly well constructed reflectors, and the cheaper the make of such reflectors, the more divergent will be the rays thrown by it.

Thus in reflectors used with automobiles, very little care is given to correctly curve them, the result of which is that the reflectors of headlights throw the rays in a wide cone forwards. We might call such cone a "divergent" cone to distinguish it from the "inverted" cone of light we are producing with our improved device.

The disadvantage of a widely "divergent" light beam lies mainly in the side glare. Not only is the approaching driver blinded by the undimmed headlight rays at a far distance straight ahead of him, but when he comes nearer the stray side glare still will affect his vision.

One of the objects of our invention is to eliminate that side glare, which not only is of no use as to giving a better light effect, but indeed diminishes the power of the headlights.

Our device makes effective use of the side glare, as it concentrates the otherwise useless stray light rays to an inverted conical beam of increased power.

Having thus generally described the intended functions of our device, we will add in the following description further objects of our invention in connection with the accompanying drawings, forming part of this specification, and in which:

Figure 1 represents a vertical cross-sectional view through a preferred form of our device.

Figure 2 is a front elevation of the same.

Figure 3 is a detail cross-sectional view through a blade, shutter or deflector element of our device, showing the mode of deflection of light rays striking the respective edges of the element.

Figure 4 is a top view of a deflector element.

Figure 5 is partial detail cross sectional view through another form of our device suggesting the possibility of modifying the angle of deflection of the light rays by changing the position of the deflector elements.

Figure 6 illustrates another form of a deflector element.

Figure 7 is a diagram showing an inverted conical light beam thrown by our device on the road.

Referring to the drawings numeral 10 denotes a parabolic reflector provided with a socket 11 for receiving an electric bulb 12, which latter is placed at the focus of the reflector. The latter is equipped with a lens 13 held in position by means of a rim 14 or in another convenient manner. At the outer face of the lens or glass 13 our device is preferably secured by the same device holding the lens.

The deflector consists of a flat ring 15 from which extends a shield or vane 16 overhanging a plurality of deflector elements arranged below and having a polished lower face and dull or painted upper face. The uppermost deflector element 17 is widest, and the width of the elements arranged below element 17 gradually diminishes towards the lowermost element 18 which is smallest in width.

It will be seen from the drawings that the distances between the elements increase with their width, that is, in upward direction. Thus the distance between element 18 and the one above is smaller than the distance between deflector element 17 and the one directly below it.

It will also be observed that the front edge of one deflector element coincides with the rear edge of the next lower element when viewed from the front of the device as illustrated in Figure 2.

The general typical shape of the element is spherical in appearance with somewhat rounded off ends, while their width is maintained substantially over their entire length as may be seen in Figure 4. Yet we do not wish to limit ourselves to this design, as we have experimented with other forms giving similar effects, as for instance the shape shown in Figure 6.

The curvature of the deflector elements appears to be circular. In reality however, the curves described by the elements are vertices of perfect paraboli, and their shapes are not portions of spheres but portions of a widely spread paraboloid, which feature is to be borne in mind for future reference.

Generally speaking the deflector elements, are convexly curved with the apex or rather vertex of their curvature directed upwards. Their vertices are disposed, at the vertical center line of our device.

Due to the fact that the front edge of one element coincides with the rear edge of the element next below, no direct rays are permitted to pass from reflector 10 through the device. All light beams must therefore strike the lower, polished surface of the elements in the manner shown in Figure 3, from which they are deflected downwards at an angle.

The position, or angle, at which the elements are set is such, that the light is carried forwards to light an area of the road for a sufficient distance in front of the vehicle to make travelling safe for its occupants.

The stray rays, producing the side glare, are caught by the ends of the deflector elements and instead of being just cut off from view they are deflected, and together with the other rays, are concentrated to an inverted cone-beam of high intensity as illustrated in diagram Figure 7.

In some instances it becomes desirable to alter the deflection of the light, for example when going down or climbing a hilly road. In the first case it is preferable to deflect at a wider angle, while it is advantageous to deflect at an acuter angle when going up hill. For this purpose we have devised an arrangement shown in Figure 5, where in front of lens or glass 13' is a deflector frame 15' provided with a plurality of hinges 19 adapted to receive the ends of deflector elements 20. The front edges of the elements are held in forks 21 extending from a shiftable rod or blade 22 which may be operated from the seat of the driver.

While we have shown specific constructions of our device, be it understood that mechanical improvements and other changes may be made by us without departing from the broad scope of our invention for which we claim:

1. A headlight deflector comprising a plurality of substantially parallel upwardly and parabolically curved deflector elements progressively spaced from the lowermost to the uppermost element and increasing in width from the uppermost to the lowermost element, said elements being so arranged that the front edge of one element substantially coincides with the rear edge of the next lower element when the deflector is viewed from its front.

2. A headlight deflector comprising a plurality of substantially parallel and substantially spherical deflector elements curved on a parabola and having their vertices at their vertical center line, said deflector elements diminishing in width from the uppermost towards the lowermost element, and being progressively spaced in upward direction, the elements being so arranged that the front edge of one element coincides with the rear edge of the next lower element, thus preventing direct rays to pass through the deflector, and a shield extending beyond all deflector elements.

Signed at New York in the county of New York and State of New York this 4th day of November A. D. 1922.

JESSE BROOKS.
JAMES DEAN.